UNITED STATES PATENT OFFICE.

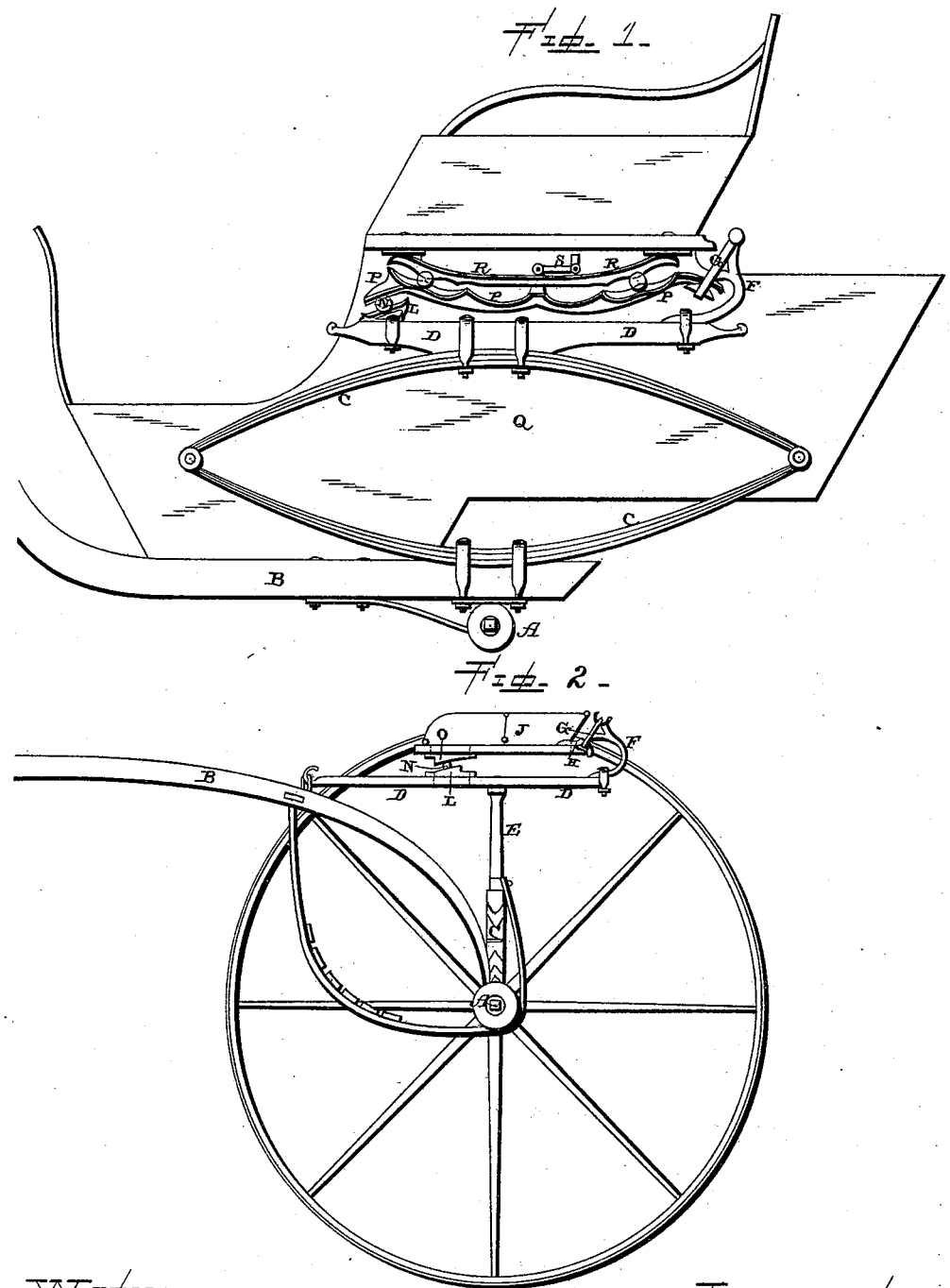

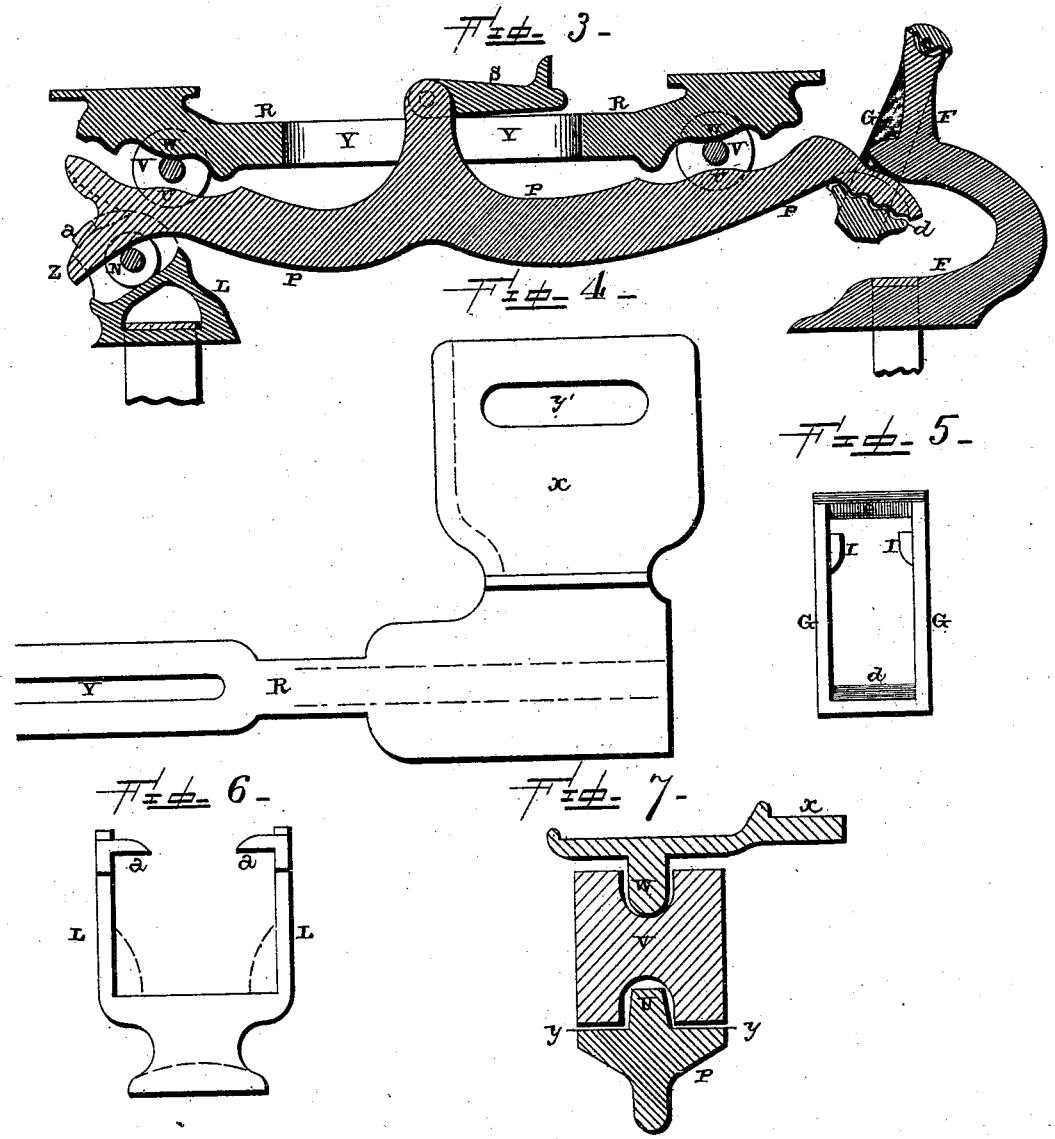

CHARLES D. CARTER, OF SPRING ARBOR, MICHIGAN.

ROAD-CART.

SPECIFICATION forming part of Letters Patent No. 395,952, dated January 8, 1889.

Application filed July 14, 1888. Serial No. 279,955. (No model.)

*To all whom it may concern:*

Be it known that I, CHARLES D. CARTER, of Spring Arbor, in the county of Jackson and State of Michigan, have invented certain new and useful Improvements in Road-Carts; and I do hereby declare the following to be a full, clear, and exact description of the invention, such as will enable others skilled in the art to which it pertains to make and use it, reference being had to the accompanying drawings, which form part of this specification.

My invention relates to an improvement in road-carts; and it consists in, first, the combination of two brackets secured to the ends of a side bar, with a connecting-link which is attached to the rear bracket and helps to support the body or seat of the cart, and a metallic bearing or bar connected to the front edge of the seat, and a friction-roller which is placed between this bearing or bar and the bracket on the front end of the side bar, whereby the horse motion is prevented from being imparted to the body or seat; second, the combination of the side bars which are mounted upon suitable springs, two brackets which are mounted upon the end of each side bar, a connecting-link which is loosely attached to each one of the rear brackets, a metallic rod or bearing which is supported at its rear end by the link and at its front end by a friction-roller, friction-rollers which are placed upon the top of the metallic bearing or bar, and a top bar which is secured to the end of the seat and moves upon the friction-rollers, as will be more fully described hereinafter.

The objects of my invention are to provide the seats of road-carts with suitable movable supporting devices, which allow the seat or body of the cart to move independently of the parts to which it is attached, and thus prevent the horse motion from being imparted to it, and to provide the body of the road-cart with suitable means whereby it automatically adjusts itself into a horizontal position whether going up or down hill, or when the riders lean forward or back.

Figure 1 is a side elevation of a road-cart which embodies my invention. Fig. 2 is a side elevation of a speeding-cart. Fig. 3 is an enlarged detail view showing the different parts of my invention entirely detached from the cart. Fig. 4 is a plan view of the top bar alone. Fig. 5 is a detached view of the link.
Fig. 6 is an end view of the front bracket.
Fig. 7 is a vertical section taken through the rear roller.

A represents the axle, B the thills, C one of the side springs, D the side bar, all of which are secured rigidly together in any suitable manner. In road-carts the side bar D is applied directly to the top of the spring C; but in speeding-carts suitable supporting-standards, E, are placed between the top of the spring and the side bars, as shown.

In speeding-carts it is only desirable to prevent the horse motion from being imparted to the seat, and it is immaterial whether the seat is on a perfect level when going up or down hill. For this reason it is unnecessary to apply to the seat of a speeding-cart all of the devices which are applied to the body of a road-cart. In speeding-carts the curved bracket F is secured to the rear end of the side bar, D, and hung upon the upper end of this bracket by a knife-edge is the supporting-link G shaped as shown in Fig. 5. The bearing upon the bracket F is made concave, and a flange, e, formed upon the inner side of the link G, forms the knife-edge, which rests upon the concave and reduces the friction between the parts as much as possible.

The lower end of the link G is widened out and has a number of serrations formed upon its top, with which corresponding serrations on the under side of the supporting-bracket H engage. These serrations allow the link G and the bracket H to swing freely back and forth without the slightest danger of becoming disconnected. Suitable flanges or projections, I, formed upon the inner side of the link G, catch upon opposite sides of the upright bearing portion of the bracket F, and thus prevent the link from becoming disconnected from the bearing in which it rests.
The supporting-bracket H is secured to the rear corner of the seat J, which is supported entirely by the link as it hangs upon the bracket F.

To the side bar, D, at any suitable point, is secured a bracket, L, which has its upper surface formed upon a circle, of which the axle is the center, and which is grooved so as to receive the friction-roller N. To the under side of the front of the seat is secured a metallic bearing, O, which is grooved upon its lower edge, and this grooved lower edge bears upon the friction-roller N, for the purpose of allowing the seat J to have a vibratory motion upon the supporting-link G and the roller N. When the horse is in motion, none of its movement is imparted to the seat J, because it can move back and forth independently of the parts upon which it rests. Where it is not desired to keep the seat J in a horizontal position, the adjustments above described are all that are necessary, one set being applied under each end of the seat.

In road-carts where it is desirable to keep the seat always horizontal, whether going up or down hill, or when the riders lean either forward or back, then a slightly different construction and a greater number of parts are necessary.

As shown in Fig. 1, the brackets F and L are secured to opposite ends of the side bars, D, and instead of the supporting-brackets H (shown in Fig. 2) a curved supporting-bar, P, is used, and which is supported by the link G at its rear end, and which has its front end curved downward, so as to rest upon the friction-roller N, placed in or upon the bracket L. This bar P is not connected directly to the seat or body Q of the cart, but is fastened to the top bar, R, by a suitable clamping device, S, and this top bar, R, is secured rigidly to the end of the seat or body Q. As shown in Fig. 4, the ends of the top bar, R, have lateral projections or flanges $x$, which are slotted, and through these slots $y'$ are passed the fastening-bolts, which secure this bar rigidly to the end of the seat or body.

As shown in Fig. 7, at each end of the supporting-bar P there are formed two tracks or ways, $y$, which are separated from each other by the central flange, U, upon the center of the bar P. Resting upon these ways or tracks $y$ and supporting the ends of the top bar, R, are the two grooved friction-rollers V, and upon which rollers the top bar, R, automatically adjusts itself, so as to keep the seat or body of the cart always in a horizontal position. Formed on the under side of the ends of the top bar, R, are the flanges W, which catch in the grooves of the rollers V, and thus the rollers V are prevented from having any lateral movement by having the flanges U W catch in their grooves.

In order to secure the two bars P R together, the bar R is slotted for a suitable distance at its center, and rising from the top of the supporting-bar P is a flange or projection, which passes up through the slot Y, and fastened to the top of this projection, above the top of the bar R, is a suitable clamping or fastening device, S, which serves to hold the two bars in a fixed relation to each other, and thus prevents them from becoming separated to such an extent that the rollers V can jump out from between them. The clamping device S does not interfere in any manner with the endwise movement of the top bar, R, and the seat or body Q, which is secured to it, and the friction-rollers V serve to cause the body or seat to move with as little friction as possible. The horse motion is not imparted to the body Q, for the reason that it is supported by the links G and the friction-rollers N, as already described. In going up or down hill, or when the riders incline their bodies either back or forward, the seat or body Q being supported entirely by the top bars, R, which rest only on the friction-rollers V, the body automatically moves back and forth, so as to always maintain itself in a horizontal position.

As shown in Fig. 3, the brackets L are so formed as to have the friction-rollers placed inside of them, so as to prevent any possibility of their becoming displaced, and the front ends of the bars P are prevented from having any vertical play independently of the brackets L by having a projection, Z, upon their ends to pass through the brackets, as shown. The forward motion of the bars P is checked by having the projections Z strike against the inwardly-turned flanges $a$ upon the top of the brackets L, and the rearward motion of the bars is controlled by the links G.

By the construction here shown all horse motion is prevented from being imparted both to carts which are used simply for speeding or light driving and the bodies of road-carts, and by having the bodies or seats automatically adjusted and always remaining in a horizontal position any strain is prevented from coming upon the horse.

The main principle of this construction for preventing the motion of the horse being communicated to the body or seat lies in having the bearing for the front roller formed into a segment of a circle of which the axle is the center. As it is placed forward of the axle, it is somewhat inclined, which causes the seat to roll forward, inclining the link until it stands in a radius with the axle. This allows the frame to work with the horse without imparting any motion whatever to the seat.

Having thus described my invention, I claim—

1. The combination of the axle, the thills, the springs, and the side bars with the supporting-brackets placed upon the rear ends of the side bars, the links, the supports secured to the seat or body and connected at their rear ends to the links with the front bracket, the friction-roller, and the bearing secured to the seat or body which rests upon the roller, whereby the seat or body has a vibratory movement independently of the side bars, substantially as shown.

2. The combination of the side bars, the brackets L, secured thereto, the supporting-bar connected at its rear end to the link, and which is supported at its front end by the friction-roller N upon the bracket L, the top bar loosely connected to the supporting-bar and rigidly secured to the seat or body, and the friction-rollers, which are placed between the two bars, substantially as described.

3. In a cart, the combination of the side bars, the seat or body, which is supported at its rear corners by means of supporting-links loosely connected to the side bars, suitably-grooved bearings at the front corners of the seats, and friction-rollers, which are placed between these bearings, whereby the seat has a movement independently of the side bars, substantially as shown.

4. The combination of the body or seat of a cart, side bars between which the seat or body is suspended, suitable supporting-bars loosely connected to the side bars, and friction-rollers placed between the supporting-bars, whereby the seat automatically adjusts itself into a horizontal position, substantially as specified.

5. In a road-cart, the combination, with the frame, of the seat, bars between which the seat is suspended, and the bearings placed between the seat and the frame, and which extend in the radius of a circle of which the axle is the center, and upon which the seat rests, whereby the frame is allowed a free movement without affecting the seat, substantially as shown and described.

In testimony whereof I affix my signature in presence of two witnesses.

CHARLES D. CARTER.

Witnesses:
D. W. THOMPSON,
D. G. PALMER.